(12) United States Patent
Mimura

(10) Patent No.: US 8,107,001 B2
(45) Date of Patent: Jan. 31, 2012

(54) IMAGE FORMING OPTICAL SYSTEM AND ELECTRONIC IMAGE PICKUP APPARATUS USING THE SAME

(75) Inventor: Takayuki Mimura, Kanagawa (JP)

(73) Assignee: Olympus Corporation, Tokyo (JP)

( * ) Notice: Subject to any disclaimer, the term of this patent is extended or adjusted under 35 U.S.C. 154(b) by 278 days.

(21) Appl. No.: 12/653,786

(22) Filed: Dec. 18, 2009

(65) Prior Publication Data

US 2010/0188554 A1 Jul. 29, 2010

(30) Foreign Application Priority Data

Dec. 25, 2008 (JP) ................................. 2008-330003

(51) Int. Cl.
*H04N 5/225* (2006.01)

(52) U.S. Cl. .......................... 348/360; 348/335; 359/690

(58) Field of Classification Search .. 348/240.99–240.3, 348/360, 361, 335; 359/690, 689, 565; 514/235.5
See application file for complete search history.

(56) References Cited

U.S. PATENT DOCUMENTS 6,542,301 B1 * 4/2003 Fujibayashi .................. 359/565
2009/0118283 A1 * 5/2009 Defert et al. ................ 514/235.5
2011/0279909 A1 * 11/2011 Nakagawa et al. ........... 359/690

FOREIGN PATENT DOCUMENTS

| JP | 2006-349947 | 12/2006 |
| JP | 2007-163964 | 6/2007 |
| JP | 2007-298555 | 11/2007 |

\* cited by examiner

*Primary Examiner* — Tuan Ho

(74) *Attorney, Agent, or Firm* — Kenyon & Kenyon LLP

(57) ABSTRACT

An image forming optical system includes in order from an object side to an image surface, a first lens group having a positive refracting power, a second lens group having a negative refracting power, and a third lens group having a positive refracting power. At the time of zooming from a wide angle end to a telephoto end, a distance between the first lens group and the second lens group increases, and a distance between the second lens group and the third lens group decreases. The first lens group has a cemented lens which includes a first lens element E1, a second lens element E2, and a third lens element E3. In the cemented lens, the first lens element E1 is cemented to a surface on one side of the second lens element E2, and the third lens element E3 is cemented to another surface of the second lens element E2. The first lens element E1 is a negative lens, and the second lens element E2 is a positive lens. The image forming optical system satisfies predetermined conditional expressions.

7 Claims, 11 Drawing Sheets

IMAGE FORMING OPTICAL SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2008-330003 filed on Dec. 25, 2008; the entire contents of which are incorporated herein by reference.

BACKGROUND OF THE INVENTION

1. Field of the Invention

The present invention relates to an image forming optical system and an electronic image pickup apparatus using the same.

2. Description of the Related Art

As a zoom lens system for an image pickup apparatus with a high zooming ratio, in which, an image pickup element of a large number of pixels is used, zoom lens systems described in Japanese Patent Application Laid-open Publication Nos. 2007-298555, 2006-349947, and 2007-163964 are available. The zoom lens systems in these reference patent literatures have a cemented lens in a first lens group. Moreover, the cemented lens has a sandwich structure in which, a resin having a specific partial dispersion ratio and Abbe's number is sandwiched.

SUMMARY OF THE INVENTION

An image forming optical system according to a first aspect of the present invention includes in order from an object side to an image surface a first lens group having a positive refracting power, a second lens group having a negative refracting power, and a third lens group having a positive refracting power, and at the time of zooming from a wide angle end to a telephoto end, a distance between the first lens group and the second lens group increases, and a distance between the second lens group and the third lens group decreases, and a first lens group has a cemented lens which includes a first lens element E1, a second lens element E2, and a third lens element E3, and in the cemented lens, the first lens element E1 is cemented to a surface on one side of the second lens element E2, and the third lens element E3 is cemented to another surface of the second lens element E2, and the first lens element E1 is a negative lens, and the second lens element E2 is a positive lens, and the image forming optical system satisfies the following conditional expressions (1), (2), (3), and (4)

$$20 < |\nu_{\textit{eff}} - \nu3| < 80 \quad (1)$$

$$0 < |\theta gF_{\textit{eff}} - \theta gF3| < 0.10 \quad (2)$$

$$0.5 < \theta gF2 < 0.9 \quad (3)$$

$$1.2 < (fG1 + 0.7\,ft)/enz < 5 \quad (4)$$

where,

ν1, ν2, and ν3 denote Abbe's number for the first lens element E1, the second lens element E2, and the third lens element E3 respectively, fE1 and fE2 denote focal length of the first lens element E1 and the second lens element E2 respectively, f double denotes a combined focal length of the cemented lens when a boundary surface on an image surface side of the second lens element E2 is air, θgF1 denotes a partial dispersion ratio (ng1−nF1)/(nF1−nC1) of the first lens element E1, θgF2 denotes a partial dispersion ratio (ng2−nF2)/(nF2−nC2) of the second lens element E2, θgF3 denotes a partial dispersion ratio (ng3−nF3)/(nF3−nC3) of the third lens element E3, nC1, nF1, and ng1 denote a refractive index of the first lens element E1 for a C-line, an F-line, and a g-line respectively, nC2, nF2, and ng2 denote a refractive index of the second lens element E2 for the C-line, the F-line, and the g-line respectively, nC3, nF3, and ng3 denote a refractive index of the third lens element E3 for the C-line, the F-line, and the g-line respectively, ν deff and θgFeff denote equivalent Abbe's number and equivalent partial dispersion ratio respectively when the cemented lens includes only the first lens element E1 and the second lens element E2, and are expressed by the following expressions $$\nu_{\textit{deff}} = \frac{1}{f_t \cdot \left(\frac{\phi_1}{\nu 1} + \frac{\phi_2}{\nu 2}\right)} = \frac{\nu 1 \cdot \nu 2}{a \cdot \nu 2 + (1-a) \cdot \nu 1}$$

$$\theta F_{\textit{eff}} = f_{\textit{double}} \cdot \nu e \left(\frac{\theta gF1}{\nu 1} \cdot \phi_1 + \frac{\theta gF2}{\nu 2} \cdot \phi_2\right)$$
$$= \nu e \left(\frac{a \cdot \nu 2 \cdot \theta gF1 + (1-a) \cdot \nu 1 \cdot \theta gF2}{\nu 1 \cdot \nu 2}\right)$$

where, $$a = \frac{\phi 1}{\phi 1 + \phi 2}$$

$$\phi 1 = \frac{1}{fE1}$$

$$\phi 2 = \frac{1}{fE2}$$

where, fG1 denotes a focal length of the first lens group, ft denotes a focal length at the telephoto end of the image forming optical system, and enz denotes a distance from a first lens surface of the image forming optical system up to an entrance-pupil position.

An electronic image pickup apparatus according to a second aspect of the present invention includes the abovementioned image forming optical system and an electronic image pickup element.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A shows a state at the wide angle end, FIG. 2B shows an intermediate state, and FIG. 2C shows a state at the telephoto end;

FIG. 3A shows a state at the wide angle end, FIG. 3B shows an intermediate state, and FIG. 3C shows a state at the telephoto end;

FIG. 4A shows a state at the wide angle end, FIG. 4B shows an intermediate state, and FIG. 4C shows a state at the telephoto end;

FIG. 11A is a front view of a mobile telephone 400, FIG. 11B is a side view of the mobile telephone 400, and FIG. 11C is a cross-sectional view of an image pickup optical system 405.

DETAILED DESCRIPTION OF THE PREFERRED EMBODIMENTS

Figure 1A:
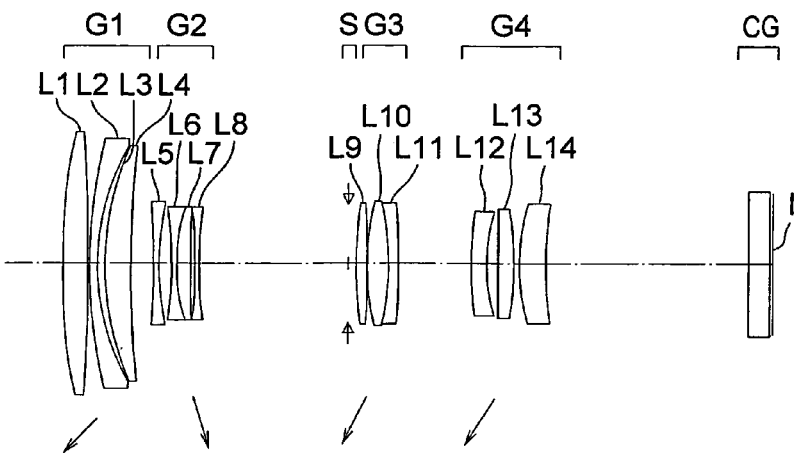
FIG. 1A, FIG. 1B, and FIG. 1C are cross-sectional views along an optical axis showing an optical arrangement at the time of infinite object point focusing of a zoom lens system according to a first embodiment of the present invention, where.

An image forming optical system of the present invention includes in order from an object side to an image surface, a first lens group having a positive refracting power, a second lens group having a negative refracting power, and a third lens group having a positive refracting power, and at the time of zooming from a wide angle end to a telephoto end, a distance between the first lens group and the second lens group increases, and a distance between the second lens group and the third lens group decreases, and the first lens group has a cemented lens which includes a first lens element E1, a second lens element E2, and a third lens element E3, and in the cemented lens, the first lens element E1 is cemented to a surface on one side of the second lens element E2, and the third lens element E3 is cemented to another surface of the second lens element E2, and the first lens element E1 is a negative lens, and the second lens element E2 is a positive lens, and the image forming optical system satisfies the following conditional expressions (1), (2), (3), and (4).

$$20 < |\nu_{eff} - \nu 3| < 80 \quad (1)$$

$$0 < |\theta gFeff - \theta gF3| < 0.10 \quad (2)$$

$$0.5 < \theta gF2 < 0.9 \quad (3)$$

$$1.2 < (fG1 + 0.7\,ft)/enz < 5 \quad (4)$$

where,

ν1, ν2, and ν3 denote Abbe's number for the first lens element E1, the second lens element E2, and the third lens element E3 respectively, fE1 and fE2 denote focal length of the first lens element E1 and the second lens element E2 respectively, f double denotes a combined focal length of the cemented lens when a boundary surface on an image surface side of the second lens element E2 is air, θgF1 denotes a partial dispersion ratio (ng1−nF1)/(nF1−nC1) of the first lens element E1, θgF2 denotes a partial dispersion ratio (ng2−nF2)/(nF2−nC2) of the second lens element E2, θgF3 denotes a partial dispersion ratio (ng3−nF3)/(nF3−nC3) of the third lens element E3, nC1, nF1, and ng1 denote a refractive index of the first lens element E1 for a C-line, an F-line, and a g-line respectively, nC2, nF2, and ng2 denote a refractive index of the second lens element E2 for the C-line, the F-line, and the g-line respectively, nC3, nF3, and ng3 denote a refractive index of the third lens element E3 for the C-line, the F-line, and the g-line respectively, ν deff and θgFeff denote equivalent Abbe's number and equivalent partial dispersion ratio respectively when the cemented lens includes only the first lens element E1 and the second lens element E2, and are expressed by the following expressions $$\nu_{deff} = \frac{1}{f_t \cdot \left(\frac{\phi_1}{\nu 1} + \frac{\phi_2}{\nu 2}\right)} = \frac{\nu 1 \cdot \nu 2}{a \cdot \nu 2 + (1-a) \cdot \nu 1}$$

$$\theta gFeff = f_{double} \cdot \nu e\left(\frac{\theta gF1}{\nu 1} \cdot \phi_1 + \frac{\theta gF2}{\nu 2} \cdot \phi_2\right)$$

$$= \nu e\left(\frac{a \cdot \nu 2 \cdot \theta gF1 + (1-a) \cdot \nu 1 \cdot \theta gF2}{\nu 1 \cdot \nu 2}\right)$$

where, $$a = \frac{\phi 1}{\phi 1 + \phi 2}$$

$$\phi 1 = \frac{1}{fE1}$$

$$\phi 2 = \frac{1}{fE2}$$

where, fG1 denotes a focal length of the first lens group, ft denotes a focal length at the telephoto end of the image forming optical system, and enz denotes a distance from a first lens surface of the image forming optical system up to an entrance-pupil position.

Moreover, in the image forming optical system of the present invention, it is preferable that the image forming optical system satisfies the following conditional expression (5).

$$2.5 < fE2/fG1 < 3.0 \quad (5)$$

where, fG1 denotes the focal length of the first lens group, and fE2 denotes a focal length of the second lens element.

Moreover, in the image forming optical system of the present invention, it is preferable that each of the first lens element E1, the second lens element E2, and the third lens element E3 has a positive refracting power, and the cemented lens includes the first lens element E1, the second lens element E2, and the third lens element E3, and the first lens group includes a single lens having a positive refracting power and a cemented lens.

Moreover, in the image forming optical system of the present invention, it is preferable that the first lens group includes a single lens having a positive refracting power, and the single lens having a positive refracting power is disposed on an object side than the cemented lens.

Moreover, in the image forming optical system of the present invention, it is more preferable that that the image forming optical system satisfies the following conditional expression (6).

$$0.5 < (Ra+Rb)/(Ra-Rb) < 1.2 \quad (6)$$

where,

Ra denotes a radius of curvature of an image-side surface of the single lens having a positive refracting power, and Rb denotes a radius of curvature of an object-side surface of the cemented lens.

In the image forming optical system of the present invention, it is preferable that a surface on the object side of a lens positioned nearest to the object side in the second lens group is a concave surface.

An electronic image pickup apparatus of the present invention includes one of the abovementioned image forming optical systems, and an electronic image pickup element.

Before describing embodiments, an action and an effect of the image forming optical system of the embodiments will be described below.

An image forming optical system of the embodiments includes in order from an object side to an image surface, a first lens group having a positive refracting power, a second lens group having a negative refracting power and a third lens group having a positive refracting power, and at the time of zooming from a wide angle end to a telephoto end, a distance between the first lens group and the second lens group increases, and a distance between the second lens group and the third lens group decreases, thereby carrying out zooming. The first lens group has a cemented lens which includes a first lens element E1, a second lens element E2, and a third lens element E3. Moreover, in the cemented lens, the first lens element E1 is cemented to a surface on one side of the second lens element E2, and the third lens element E3 is cemented to another surface of the second lens element E2. Moreover, the first lens element E1 is a negative lens, and the second lens element E2 is a positive lens.

Furthermore, the image forming optical system, upon having such arrangement, satisfies the following conditional expressions (1), (2), (3), and (4).

$$20 < |v_{\textit{eff}} - v3| < 80 \quad (1)$$

$$0 < |\theta gFeff - \theta gF3| < 0.10 \quad (2)$$

$$0.5 < \theta gF2 < 0.9 \quad (3)$$

$$1.2 < (fG1 + 0.7\ ft)/enz < 5 \quad (4)$$

where, v1, v2, and v3 denote Abbe's number for the first lens element E1, the second lens element E2, and the third lens element E3 respectively, fE1 and fE2 denote focal length of the first lens element E1 and the second lens element E2 respectively, f double denotes a combined focal length of the cemented lens when, a boundary surface on an image surface side of the second lens element E2 is air, θgF1 denotes a partial dispersion ratio (ng1−nF1)/(nF1−nC1) of the first lens element E1, θgF2 denotes a partial dispersion ratio (ng2−nF2)/(nF2−nC2) of the second lens element E2, θgF3 denotes a partial dispersion ratio (ng3−nF3)/(nF3−nC3) of the third lens element E3, nC1, nF1, and ng1 denote a refractive index of the first lens element E1 for a C-line, an F-line, and a g-line respectively, nC2, nF2, and ng2 denote a refractive index of the second lens element E2 for the C-line, the F-line, and the g-line respectively, nC3, nF3, and ng3 denote a refractive index of the third lens element E3 for the C-line, the F-line, and the g-line respectively, vdeff and θgFeff denote equivalent Abbe's number and equivalent partial dispersion ratio respectively when the cemented lens includes only the first lens element E1 and the second lens element E2, and are expressed by the following expressions $$v_{\textit{deff}} = \frac{1}{f_t \cdot \left(\frac{\phi_1}{v1} + \frac{\phi_2}{v2}\right)} = \frac{v1 \cdot v2}{a \cdot v2 + (1-a) \cdot v1}$$

$$\theta gFeff = f_{double} \cdot ve\left(\frac{\theta gF1}{v1} \cdot \phi_1 + \frac{\theta gF2}{v2} \cdot \phi_2\right)$$

$$= ve\left(\frac{a \cdot v2 \cdot \theta gF1 + (1-a) \cdot v1 \cdot \theta gF2}{v1 \cdot v2}\right)$$

where, $$a = \frac{\phi 1}{\phi 1 + \phi 2}$$

$$\phi 1 = \frac{1}{fE1}$$

$$\phi 2 = \frac{1}{fE2}$$

where, fG1 denotes a focal length of the first lens group, ft denotes a focal length at the telephoto end of the image forming optical system, and enz denotes a distance from a first lens surface of the image forming optical system up to an entrance-pupil position.

A chromatic aberration of magnification at the telephoto end has an extremely substantial effect of a chromatic aberration which occurs in the first lens group. Therefore, normally, a cemented lens is used in the first lens group, and by making substantial a difference in Abbe's number for two lens elements forming the cemented lens, an occurrence of the chromatic aberration is to be suppressed. Incidentally, a possible range of a partial dispersion ratio for the g-line and the F-line being limited, it has hitherto been difficult to correct sufficiently up to a secondary spectrum.

Therefore, in the image forming optical system of the embodiments, three lens elements namely, the first lens element E1, the second lens element E2, and the third lens element E3 are used in the cemented lens. In this case, the cemented lens formed by the first lens element E1 and the second lens element E2 is considered as a lens equivalent to one lens. Furthermore, the cemented lens is considered to be formed by this equivalent lens and the third lens element E3. Moreover, by imparting the partial dispersion ratio which has not been there so far, to the equivalent lens, the correction of chromatic aberration up to the secondary spectrum which has hitherto been difficult in a cemented lens including two lens elements can be carried out easily.

Concretely, in the image forming optical system of the embodiments, an arrangement is made such that the image forming optical system satisfies conditional expression (1). Accordingly, it is possible to correct a primary spectrum favorably. Moreover, by the image forming optical system satisfying conditional expression (2), it is possible to correct up to the secondary spectrum favorably.

When an upper limit in conditional expression (1) is surpassed, correction of the chromatic aberration becomes excessive, which leads to degrading of an optical performance. Whereas, when a lower limit in conditional expression (1) is surpassed, it is not desirable since it becomes difficult to carry out sufficiently the correction of the chromatic aberration.

It is preferable that the image forming optical system satisfies the following conditional expression (1') instead of conditional expression (1).

$$40 < |vd_{eff} - v3| < 70 \tag{1'}$$

When the image forming optical system satisfies conditional expression (1'), since it is possible to avoid glass to be used for the cemented lens from becoming a high-cost glass, it is possible to lower a cost of a lens barrel or an overall optical system.

When an upper limit 0.1 in conditional expression (2) is surpassed, correcting the secondary spectrum sufficiently becomes difficult.

Moreover, it is preferable that the image forming optical system satisfies the following conditional expression (2') instead of conditional expression (2).

$$0 < |\theta gF_{eff} - \theta gF3| < 0.06 \tag{2'}$$

When the image forming optical system satisfies conditional expression (2'), it is possible to carry out effectively the correction of up to the secondary spectrum.

In the cemented lens including the three lens elements, it is desirable that glass material used for the second lens element E2 is a glass material having a sufficiently substantial θgF with respect to the first lens element E1. In the image forming optical system of the embodiments, an arrangement is made such that the image forming optical system satisfies conditional expression (3). By the image forming optical system satisfying conditional expression (3), θgFeff as the equivalent lens becomes a sufficiently small value. Accordingly, it is possible to carry out the correction of the secondary spectrum favorably.

When an upper limit in conditional expression (3) is surpassed, Abbe's number becomes excessively small. In this case, it is not desirable since correction of the primary spectrum becomes difficult. Whereas, when a lower limit in conditional expression (3) is surpassed, it becomes difficult to correct up to the secondary spectrum.

Moreover, it is preferable that the image forming optical system satisfies the following conditional expression (3') instead of conditional expression (3).

$$0.5 < \theta gF2 < 0.7 \tag{3'}$$

When the image forming optical system satisfies conditional expression (3'), more favorable correction of the chromatic aberration is possible without having an effect on the correction of the primary spectrum.

Moreover, at the telephoto end, for carrying out more favorable correction of chromatic aberration, it is desirable to lower a height of principal light rays of marginal light which are incident on the first lens group from the object side. For this, it is preferable to position an entrance pupil as much as possible on the object side. Therefore, in the image forming optical system of the embodiments, an arrangement is made such that conditional expression (4) is satisfied. Accordingly, since it is possible to lower the height of the principal light rays of the marginal light which is incident on the first lens group, it is possible to carry out effectively the correction of the chromatic aberration, particularly, a coma aberration due to the first lens group.

When an upper limit in conditional expression (4) is surpassed, a refracting power of the first lens group becomes insufficient. In this case, since the overall length becomes long, it is preferable. Whereas, when a lower limit in conditional expression (4) is surpassed, the height of the principal light rays of the marginal light increases. In this case, it is not desirable since it becomes difficult to correct the chromatic aberration favorably.

Moreover, it is preferable that the image forming optical system satisfies conditional expression (4') instead of conditional expression (4).

$$1.2 < (fG1 + 0.7 \text{ ft})/enz < 2.1 \tag{4'}$$

When the image forming optical system satisfies conditional expression (4'), as compared to a focal length at the telephoto end, the entrance pupil position can be brought closer to the object side. Therefore, it is possible to carry out favorable correction of the chromatic aberration.

Moreover, in the image forming optical system of the embodiments, it is preferable that the image forming optical system satisfies the following conditional expression (5).

$$2.5 < fE2/fG1 < 3.0 \tag{5}$$

where,
fG1 denotes the focal length of the first lens group, and
fE2 denotes a focal length of the second lens element E2.

When an upper limit in conditional expression (5) is surpassed, it is not possible to make θgFeff small. In this case, it is not desirable as it becomes difficult to carry out correction up to the secondary spectrum. Whereas, when a lower limit in conditional expression (5) is surpassed, there is an excessive correction, which leads to degradation of the optical performance.

Moreover, in the image forming optical system of the embodiments, it is preferable that each of the first lens element E1, the second lens element E2, and the third lens element E3 has a positive refracting power, and the cemented lens includes the first lens element E1, the second lens element E2, and the third lens element E3, and the first lens group includes a single lens having a positive refracting power and a cemented lens. When the first lens group includes only a cemented lens, the refracting power of the first lens group is susceptible to be insufficient. Therefore, it may lead to an increase in the overall length according to the situation. Therefore, by the first lens group having a lens having a positive refracting power in addition to the cemented lens, it is possible to compensate the insufficiency of the refracting power in the first lens group.

Moreover, in the image forming optical system of the embodiment, it is preferable that the first lens group has a positive single lens having a positive refracting power, and the single lens having a positive refracting power is disposed on the object side than the cemented lens.

Because the single lens having a positive refracting power is disposed on the object side than the cemented lens, it is possible to make smaller an angle of incidence of light rays with respect to the cemented lens. Accordingly, it is possible to carry out efficiently the chromatic aberration at the telephoto end.

Moreover, it is preferable that the image forming optical system of the embodiments satisfies the following conditional expression (6).

$$0.5 < (Ra+Rb)/(Ra-Rb) < 1.2 \quad (6)$$

where,

Ra denotes a radius of curvature of an image-side surface of the single lens having a positive refracting power, and Rb denotes a radius of curvature of an object-side surface of the cemented lens.

The single lens having a positive refracting power has a function of making small an angle of incidence of light rays incident on the cemented lens. Therefore, it is preferable that the image forming optical system of the embodiments satisfies the abovementioned conditional expression (6). Accordingly, it is possible to reduce an occurrence of various aberrations (other than the chromatic aberration) which occur at the single lens having a positive refracting power. When an upper limit in conditional expression (6) is surpassed, since a power of the single lens having a positive refracting power is susceptible to become insufficient, it leads to an increase in the overall length. Whereas, when a lower limit in conditional expression (6) is surpassed, it is not desirable as it leads to deterioration of the coma aberration.

Moreover, in the image forming optical system of the embodiments, it is preferable that a surface on the object side of a lens positioned nearest to the object side in the second lens group is a concave surface.

By the surface nearest to the object side of the second lens group being a concave surface, principal points of the second lens group are positioned toward the image side as compared to a case in which, the surface has a convex shape. Moreover, when such an arrangement is made, at the telephoto end, it is possible to make short a distance between principal points of the second lens group and the third lens group. Accordingly, it is possible to have a substantial zooming ratio in telephoto direction.

Moreover, it is preferable that an electronic image pickup apparatus of the embodiments is let to be an electronic image pickup apparatus which includes the abovementioned image forming optical system, and an electronic image pickup element. In the abovementioned image forming optical system, it is possible to make the overall length of the optical system thin without letting deteriorate the chromatic aberration etc. Therefore, when such image forming optical system is used in the electronic image pickup apparatus, it is possible to achieve an electronic image pickup apparatus which has been slimmed while achieving an image of a high image quality.

Embodiments

Embodiments of the image forming optical system and the electronic image pickup apparatus according to the present invention will be described below in detail by referring to the accompanying diagrams. However, the present invention is not restricted by the embodiments described below.

Figure 1B:
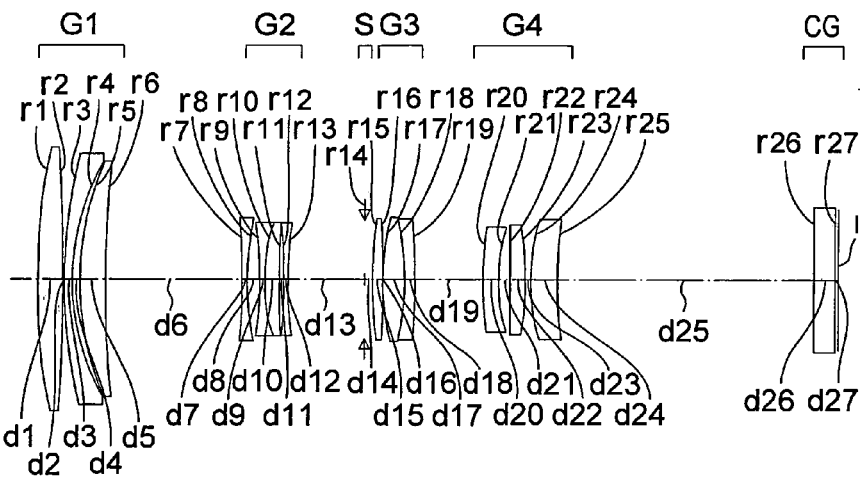
Figure 1C:
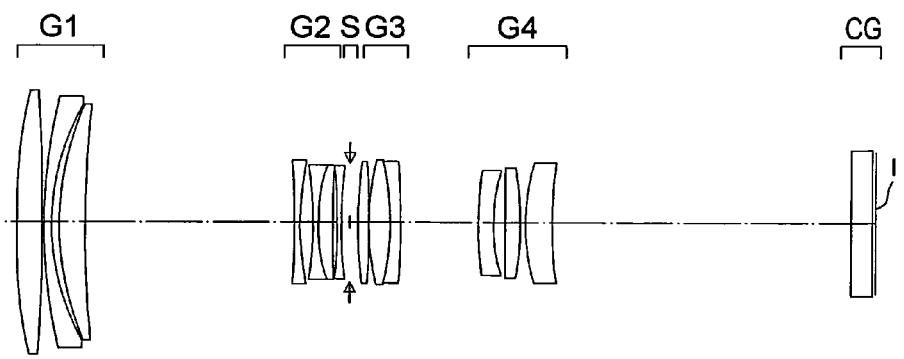

Next, a zoom lens system according to a first embodiment of the present invention will be described below. FIG. 1A, FIG. 1B, and FIG. 1C are cross-sectional views along an optical axis showing an optical arrangement at the time of infinite object point focusing of the zoom lens system according to the first embodiment of the present invention, where, FIG. 1A shows a state at a wide angle end, FIG. 1B shows an intermediate focal length state, and FIG. 1C shows a state at a telephoto end.

Figure 2A:
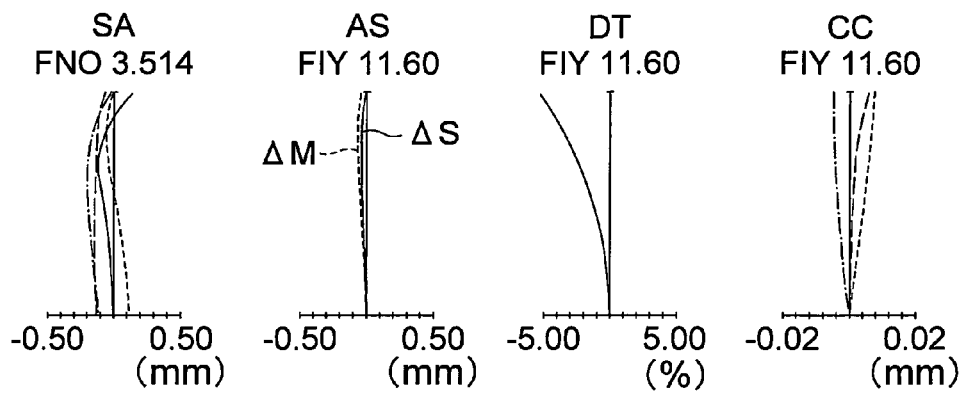
FIG. 2A, FIG. 2B, and FIG. 2C are diagrams showing a spherical aberration, an astigmatism, a distortion, and a chromatic aberration of magnification at the time of infinite object point focusing of the zoom lens system according to the first embodiment, where.
Figure 2B:
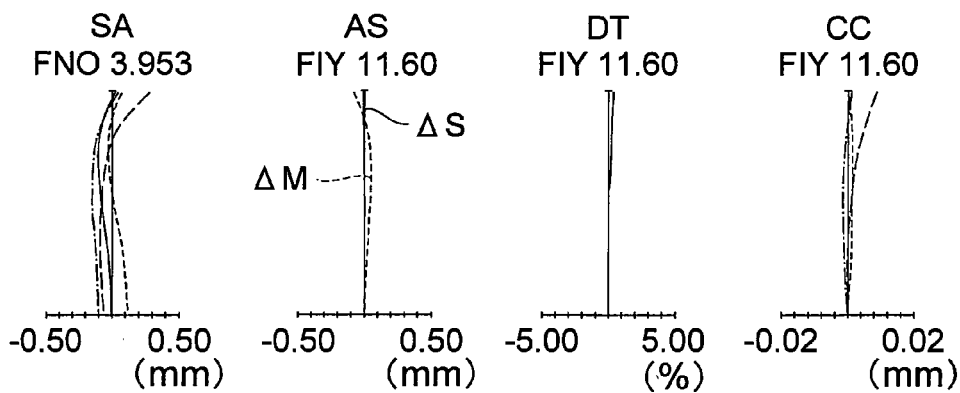
Figure 2C:
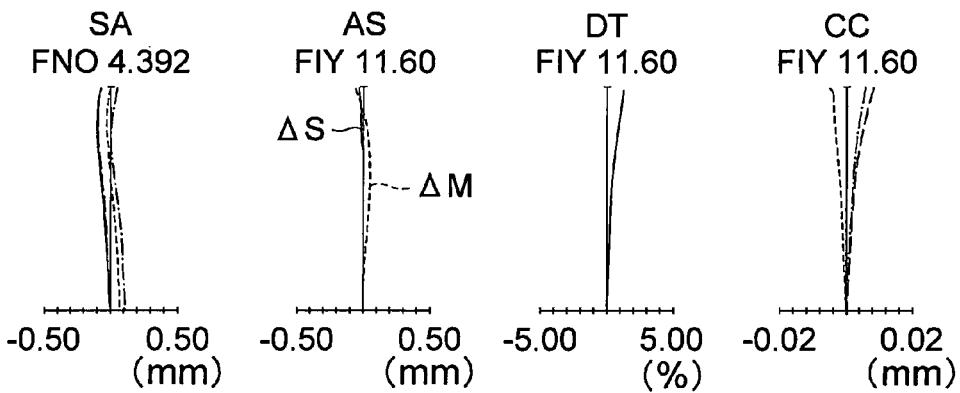

FIG. 2A, FIG. 2B, and FIG. 2C are diagrams showing a spherical aberration (SA), an astigmatism (AS), a distortion (DT), and a chromatic aberration of magnification (CC) at the time of infinite object point focusing of the zoom lens system according to the first embodiment, where, FIG. 2A shows a state at the wide angle end, FIG. 2B shows an intermediate focal length state, and FIG. 2C shows a state at the telephoto end. Moreover, FIY denotes an image height. Symbols in the aberration diagrams are same even in the embodiments to be described later.

The zoom lens system of the first embodiment, as shown in FIG. 1A, FIG. 1B, and FIG. 1C, includes in order from an object side, a first lens group G1 having a positive refracting power, a second lens group G2 having a negative refracting power, an aperture stop S, a third lens group G3 having a positive refracting power, and a fourth lens group G4 having a positive refracting power. In all the embodiments described below, in the lens cross-sectional views, LPF denotes a low pass filter, CG denotes a cover glass, and I denotes an image pickup surface of the electronic image pickup element.

The first lens group G1 includes in order from the object side, a biconvex positive lens L1, and a cemented lens of a negative meniscus lens L2 having a convex surface directed toward the object side, a positive meniscus lens L3 having a convex surface directed toward the object side, and a positive meniscus lens L4 having a convex surface directed toward the object side, and has a positive refracting power as a whole.

The second lens group G2 includes in order from the object side, a biconcave negative lens L5, a cemented lens of a biconcave negative lens L6 and a biconvex positive lens L7, and a biconcave negative lens L8, and has a negative refracting power as a whole.

The third lens group G3 includes in order from the object side, a biconvex positive lens L9, and a cemented lens of a biconvex positive lens L10 and a negative meniscus lens L11 having a convex surface directed toward an image side, and has a positive refracting power as a whole.

The fourth lens group G4 includes in order from the object side, a negative meniscus lens L12 having a convex surface directed toward the object side, a positive meniscus lens L13 having a convex surface directed toward the image side, and a positive meniscus lens L14 having a convex surface directed toward the object side, and has a positive refracting power as a whole.

At the time of zooming from the wide angle end to the telephoto end, the first lens group G1 moves toward the object side. The second lens group G2 moves toward the image side. The third lens group G3 moves toward the object side. The fourth lens group G4 moves toward the object side.

Figure 3A:
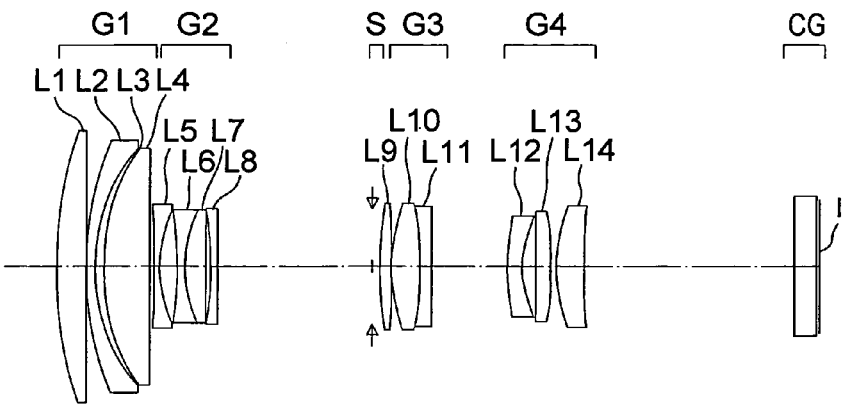
FIG. 3A, FIG. 3B, and FIG. 3C are cross-sectional views along an optical axis showing an optical arrangement at the time of infinite object point focusing of a zoom lens system according to a second embodiment of the present invention, where.
Figure 3B:
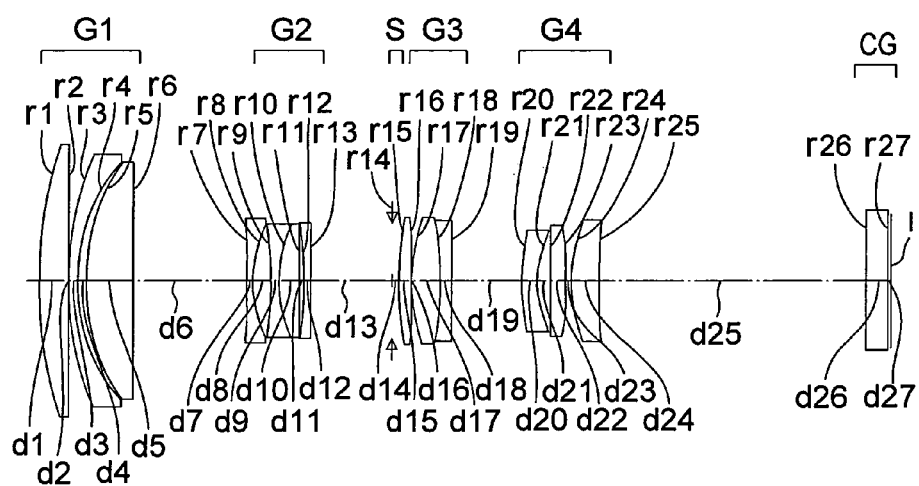
Figure 3C:
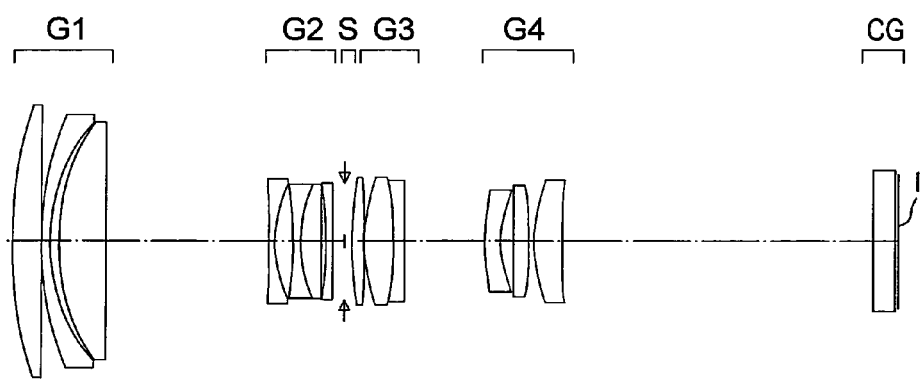

Next, a zoom lens system according to a second embodiment of the present invention will be described below. FIG. 3A, FIG. 3B, and FIG. 3C are cross-sectional views along an optical axis showing an optical arrangement at the time of infinite object point focusing of the zoom lens system according to the second embodiment of the present invention, where, FIG. 3A shows a state at a wide angle end, FIG. 3B shows an intermediate focal length state, and FIG. 3C shows a state at a telephoto end.

Figure 4A:
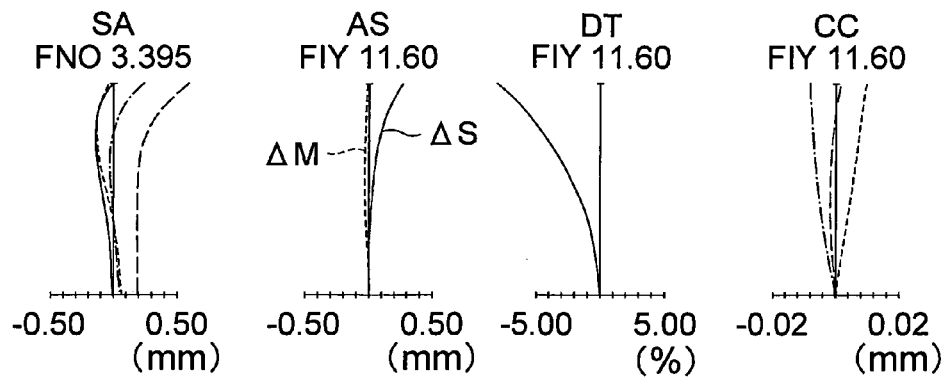
FIG. 4A, FIG. 4B, and FIG. 4C are diagrams showing a spherical aberration, an astigmatism, a distortion, and a chromatic aberration of magnification at the time of infinite object point focusing of the zoom lens system according to the second embodiment, where.
Figure 4B:
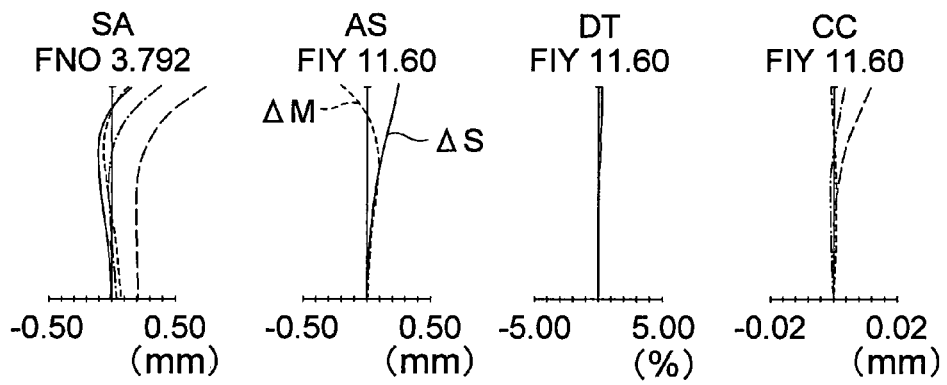
Figure 4C:
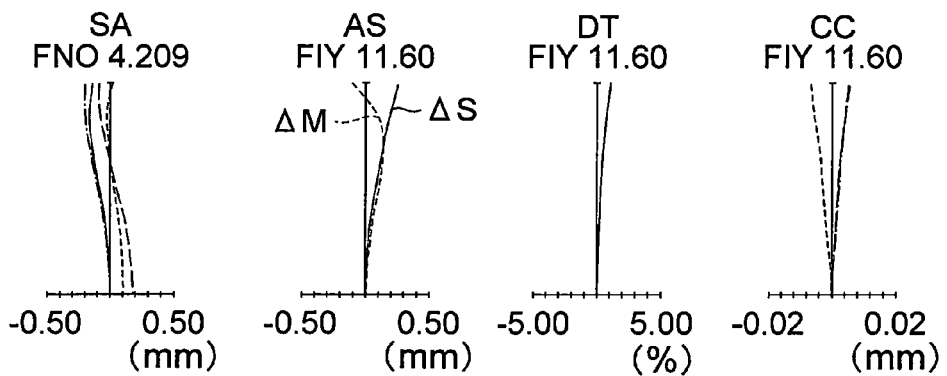

FIG. 4A, FIG. 4B, and FIG. 4C are diagrams showing a spherical aberration, an astigmatism, a distortion, and a chromatic aberration of magnification at the time of infinite object point focusing of the zoom lens system according to the second embodiment, where, FIG. 4A shows a state at the wide angle end, FIG. 4B shows an intermediate focal length state, and FIG. 4C shows a state at the telephoto end.

The zoom lens system of the second embodiment, as shown in FIG. 3A, FIG. 3B, and FIG. 3C, includes in order from an object side, a first lens group G1 having a positive refracting power, a second lens group G2 having a negative refracting power, an aperture stop S, a third lens group G3 having a positive refracting power, and a fourth lens group G4 having a positive refracting power.

The first lens group G1 includes in order from the object side, a biconvex positive lens L1, and a cemented lens of a negative meniscus lens L2 having a convex surface directed toward the object side, a positive meniscus lens L3 having a convex surface directed toward the object side, and a positive meniscus lens L4 having a convex surface directed toward the object side, and has a positive refracting power as a whole.

The second lens group G2 includes in order from the object side, a biconcave negative lens L5, a cemented lens of a biconcave negative lens L6 and a planoconvex positive lens L7, and a biconcave negative lens L8, and has a negative refracting power as a whole.

The third lens group G3 includes in order from the object side, a biconvex positive lens L9, and a cemented lens of a biconvex positive lens L10 and a negative meniscus lens L11 having a convex surface directed toward an image side, and has a positive refracting power as a whole.

The fourth lens group G4 includes in order from the object side, a negative meniscus lens L12 having a convex surface directed toward the object side, a positive meniscus lens L13 having a convex surface directed toward the image side, and a positive meniscus lens L14 having a convex surface directed toward the object side, and has a positive refracting power as a whole.

At the time of zooming from the wide angle end to the telephoto end, the first lens group G1 moves toward the object side. The second lens group G2 moves toward the image side. The third lens group G3 moves toward the object side. The fourth lens group G4 moves toward the object side.

Numerical data of each embodiment described above is shown below. Each of r1, r2, . . . denotes radius of curvature of each lens surface, each of d1, d2, . . . denotes a lens thickness or an air distance between two lenses, each of nd1, nd2, . . . denotes a refractive index of each lens for a d-line, and each of vd1, vd2, . . . denotes an Abbe's number for each lens. Further, $F_{NO}$ denotes an F number, f denotes a focal length of the entire zoom lens system, D0 denotes a distance from the object to the first surface of the lens system, and * denotes an aspheric data.

When z is let to be an optical axis with a direction of traveling of light as a positive direction, and y is let to be in a direction orthogonal to the optical axis, a shape of the aspheric surface is described by the following expression (I).

$$z=(y^2/r)/[1+\{1-(K+1)(y/r)^2\}^{1/2}]+A_4y^4+A_6y^6+A_8y^8+A_{10}y^{10} \quad (I)$$

where, r denotes a paraxial radius of curvature, K denotes a conical coefficient, A4, A6, A8, A10 denote aspherical surface coefficients of a fourth order, a sixth order, an eight order, a tenth order, and a twelfth order respectively. Moreover, in the aspherical surface coefficients, 'E-n' (where, n is an integral number) indicates '$10^{-n}$'. These references are used in following examples in common.

Moreover, by a lens denoted by sign * being made of an energy curable resin, it is possible to avoid degradation of optical performance due to decentering of surfaces. Furthermore, when a UV curable resin is used, there is no damage of an optical element due to an effect of heat at the time of manufacturing.

NUMERICAL EXAMPLE 1

Unit mm

| Surface data | | | | | |
|---|---|---|---|---|---|
| Surface no. | r | d | nd | vd | Effective radius |
| Object plane | ∞ | ∞ | | | |
| 1 | 85.115 | 5.32 | 1.48749 | 70.23 | 15.8 |
| 2 | −294.647 | 0.05 | | | 14.9 |
| 3 | 66.774 | 1.80 | 1.7552 | 27.53 | 14.1 |
| 4 | 34.329 | 1.50 | 1.63387 | 23.38 | 13.1* |
| 5 | 40.965 | 5.30 | 1.48749 | 70.23 | 12.8 |
| 6 | 170.709 | Variable | | | 11.6 |
| 7 | −101.271 | 1.00 | 1.51742 | 52.43 | 9.8 |
| 8 | 40.517 | 2.78 | | | 9.3 |
| 9 | −42.402 | 0.79 | 1.48749 | 70.23 | 9.2 |
| 10 | 27.249 | 3.05 | 1.80518 | 25.46 | 9.1 |
| 11 | −171.500 | 0.66 | | | 9.0 |
| 12 | −68.731 | 0.92 | 1.8061 | 33.27 | 8.9 |
| 13 | 70.141 | Variable | | | 8.8 |
| 14 (stop) | ∞ | 1.50 | | | 9.3 |
| 15 | 73.699 | 2.17 | 1.755 | 52.32 | 9.6 |
| 16 | −193.105 | 0.02 | | | 9.6 |
| 17 | 36.479 | 4.32 | 1.51823 | 58.9 | 9.6 |
| 18 | −37.139 | 2.00 | 1.80518 | 25.46 | 9.5 |
| 19 | −154.4095 | Variable | | | 9.4 |
| 20 | 50.617 | 3 | 1.72342 | 37.99 | 8.2 |
| 21 | 22.887 | 2.42 | | | 8.1 |
| 22 | −254.020 | 3 | 1.48749 | 70.44 | 8.3 |
| 23 | −47.1170 | 0.89 | | | 8.8 |
| 24 | 25.254 | 5.56 | 1.53172 | 48.84 | 9.4 |
| 25 | 54.283 | Variable | | | 9.3 |
| 26 | ∞ | 4.57 | 1.5168 | 64.2 | 11.4 |
| 27 | ∞ | Variable | | | 11.6 |
| Image plane | ∞ | | | | |

| Zoom data | | | |
|---|---|---|---|
| Zoom ratio 3.61 | | | |
| | Wideangle | Intermediate | Telephoto |
| Focal length | 41.00 | 81.24 | 147.97 |
| Fno. | 3.51 | 3.95 | 4.39 |
| 2ω(°) | 31.85 | 15.57 | 8.51 |
| Image height | 11.15 | 11.15 | 11.15 |
| Lens total length | 141.12 | 159.40 | 170.84 |
| Backfocus | 44.07 | 54.90 | 63.47 |
| d6 | 4.47 | 27.3584 | 41.64 |
| d13 | 29.87 | 15.21 | 2.00 |
| d19 | 14.67 | 13.89 | 15.69 |
| d25 | 40.53 | 51.54 | 60.10 |
| d27 | 0.53 | 0.35 | 0.36 |
| Position of entrance pupil | 45.25 | 96.65 | 128.80 |
| Position of exit pupil | −38.15 | −37.05 | −39.60 |
| Position of front principal point | 65.80 | 106.11 | 64.33 |
| Position of back principal point | −40.46 | −80.90 | −147.61 |

| Single lens data | | |
|---|---|---|
| lens | Initial surface | focal length |
| 1 | 1 | 136.09 |
| 2 | 3 | −95.84 |
| 3 | 4 | 307.35 |

-continued

Single lens data

| | | |
|---|---|---|
| 4 | 5 | 109.10 |
| 5 | 7 | −55.80 |
| 6 | 9 | −33.90 |
| 7 | 10 | 29.40 |
| 8 | 12 | −42.94 |
| 9 | 15 | 70.90 |
| 10 | 17 | 36.24 |
| 11 | 18 | −61.20 |
| 12 | 20 | −60.49 |
| 13 | 22 | 118.10 |
| 14 | 24 | 83.28 |

| Group | Initial Surface | Lens configuration length |
|---|---|---|
| 1 | 1 | 110.35 | 13.98 |
| 2 | 7 | −26.14 | 9.20 |
| 3 | 14 | 38.87 | 10.00 |
| 4 | 20 | 205.93 | 14.86 |

| Group | Magnification (wide angle) | Magnification (intermediate) | Magnification (telephoto) |
|---|---|---|---|
| 1 | 0 | 0 | 0 |
| 2 | −0.40 | −0.60 | −0.91 |
| 3 | −1.18 | −1.64 | −2.11 |
| 4 | 0.79 | 0.74 | 0.70 |

| Group | initial surface | position of front principal point | position of back principal point |
|---|---|---|---|
| 1 | 1 | −1.63 | −10.49 |
| 2 | 7 | 3.35 | −3.13 |
| 3 | 14 | 2.21 | −4.52 |
| 4 | 20 | 11.47 | 1.166 |

NUMERICAL EXAMPLE 2

Unit mm

Surface data

| Surface no. | r | d | nd | vd | Effective radius |
|---|---|---|---|---|---|
| Object plane | ∞ | ∞ | | | |
| 1 | 68.42 | 5.72 | 1.48749 | 70.23 | 16.9 |
| 2 | ∞ | 0.05 | | | 15.6 |
| 3 | 54.156 | 1.80 | 1.7552 | 27.53 | 14.5 |
| 4 | 29.434 | 1.50 | 1.63387 | 23.38 | 13.2* |
| 5 | 33.569 | 8.99 | 1.48749 | 70.23 | 12.9 |
| 6 | 1728.235 | Variable | | | 10.2 |
| 7 | −71.336 | 0.99 | 1.57135 | 52.95 | 9.8 |
| 8 | 20.058 | 3.38 | | | 8.8 |
| 9 | −37.416 | 1.50 | 1.48749 | 70.23 | 8.8 |
| 10 | 21.530 | 3.72 | 1.80518 | 25.46 | 8.8 |
| 11 | ∞ | 0.95 | | | 8.7 |
| 12 | −59.647 | 1.19 | 1.8061 | 33.27 | 8.7 |
| 13 | 583.809 | Variable | | | 8.7 |
| 14 (stop) | ∞ | 1.5 | | | 9.6 |
| 15 | 60.888 | 2.32 | 1.755 | 52.32 | 9.9 |
| 16 | −226.953 | 0.01 | | | 9.9 |
| 17 | 28.226 | 5.6739 | 1.48749 | 70.23 | 9.9 |
| 18 | −41.749 | 2.00 | 1.80518 | 25.46 | 9.6 |
| 19 | −2329.704 | Variable | | | 9.4 |
| 20 | 42.094 | 3.00 | 1.72342 | 37.99 | 8.3 |
| 21 | 18.874 | 2.42 | | | 8.1 |
| 22 | −466.692 | 3.00 | 1.48749 | 70.44 | 8.3 |
| 23 | −65.602 | 0.88 | | | 8.9 |
| 24 | 23.286 | 5.56 | 1.53172 | 48.84 | 9.9 |
| 25 | 162.961 | Variable | | | 9.9 |
| 26 | ∞ | 4.57 | 1.5168 | 64.2 | 11.5 |
| 27 | ∞ | Variable | | | 11.5 |
| Image plane | ∞ | | | | |

Zoom data
Zoom ratio 4.601624376

| | Wideangle | Intermediate | Telephoto |
|---|---|---|---|
| Focal length | 32.68 | 77.68 | 150.38 |
| Fno. | 3.39 | 3.79 | 4.21 |
| 2ω(°) | 40.41 | 16.28 | 8.39 |
| Image height | 11.15 | 11.15 | 11.15 |
| Lens total length | 145.95 | 163.00 | 169.73 |
| Backfocus | 44.06 | 55.02 | 63.61 |
| d6 | 1.19 | 22.72 | 32.28 |
| d13 | 29.87 | 15.21 | 2.0 |
| d19 | 14.67 | 13.89 | 15.69 |
| d25 | 40.53 | 51.54 | 60.10 |
| d27 | 0.52 | 0.47 | 0.50 |
| Position of entrance pupil | 41.35 | 109.54 | 143.65 |
| Position of exit pupil | −47.089 | −45.57 | −49.12 |
| Position of front principal point | 62.31 | 127.23 | 93.42 |
| Position of back principal point | −32.15 | −77.21 | −149.88 |

Single lens data

| lens | Initial surface | focal length |
|---|---|---|
| 1 | 1 | 139.94 |
| 2 | 3 | −88.14 |
| 3 | 4 | 330.44 |
| 4 | 5 | 70.10 |
| 5 | 7 | −27.29 |
| 6 | 9 | −27.802 |
| 7 | 10 | 26.75 |
| 8 | 12 | −67.08 |
| 9 | 15 | 63.81 |
| 10 | 17 | 35.49 |
| 11 | 18 | −52.82 |
| 12 | 20 | −50.01 |
| 13 | 22 | 156.20 |
| 14 | 24 | 50.40 |

| Group | Initial Surface | Lens configuration length |
|---|---|---|
| 1 | 1 | 80.25 | 18.06 |
| 2 | 7 | −18.83 | 11.73 |
| 3 | 14 | 37.87 | 11.51 |
| 4 | 20 | 125.82 | 14.86 |

| Group | Magnification (wide angle) | Magnification (intermediate) | Magnification (telephoto) |
|---|---|---|---|
| 1 | 0 | 0 | 0 |
| 2 | −0.40 | −0.75 | −1.20 |
| 3 | −1.48 | −2.18 | −2.95 |
| 4 | 0.68 | 0.59 | 0.53 |

| Group | initial surface | position of front principal point | position of back principal point |
|---|---|---|---|
| 1 | 1 | 0.477 | −11.33 |
| 2 | 7 | 2.21 | −5.96 |
| 3 | 14 | 1.17 | −6.44 |
| 4 | 20 | 14.00 | 3.96 |

Values of conditional expression in each of examples are shown below.

| | Conditional expression(1) | Conditional expression(2) |
|---|---|---|
| Example 1 | 40.29 | 0.046 |
| Example 2 | 40.80 | 0.053 |

| | Conditional expression(3) | Conditional expression(4) |
|---|---|---|
| Example 1 | 0.668 | 1.66 |
| Example 2 | 0.668 | 1.29 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 5:
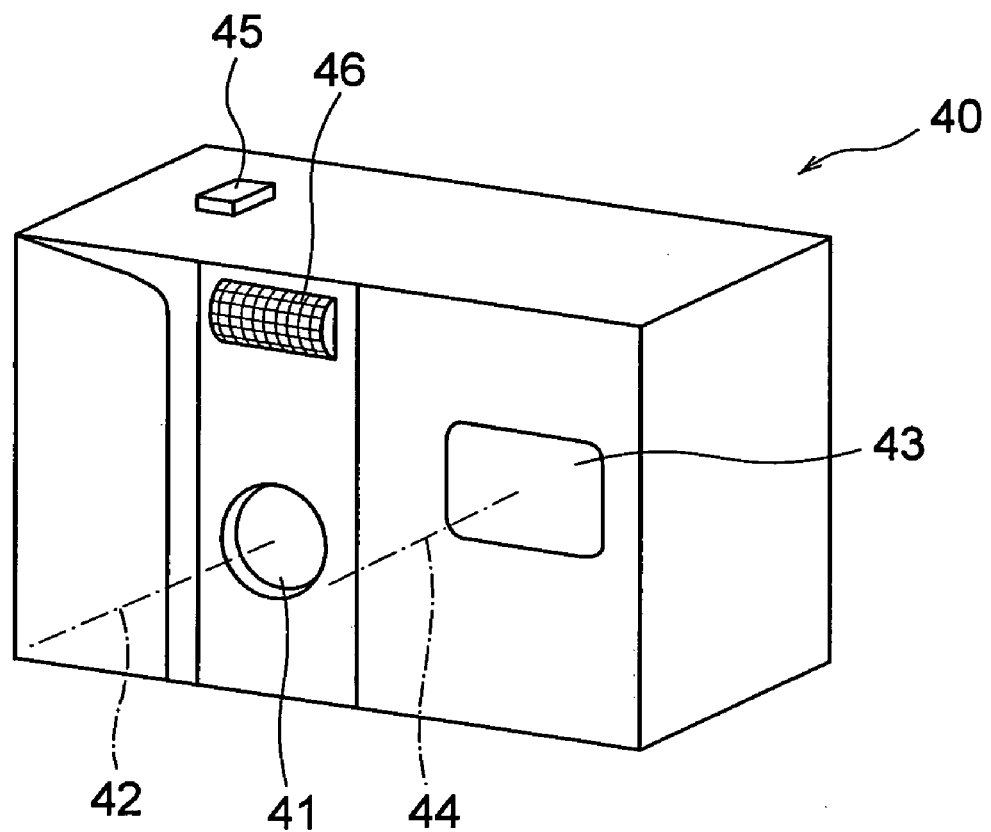
FIG. 5 is a front perspective view showing an appearance of a digital camera 40 in which, a zooming optical system according to the present invention is incorporated.
Figure 6:
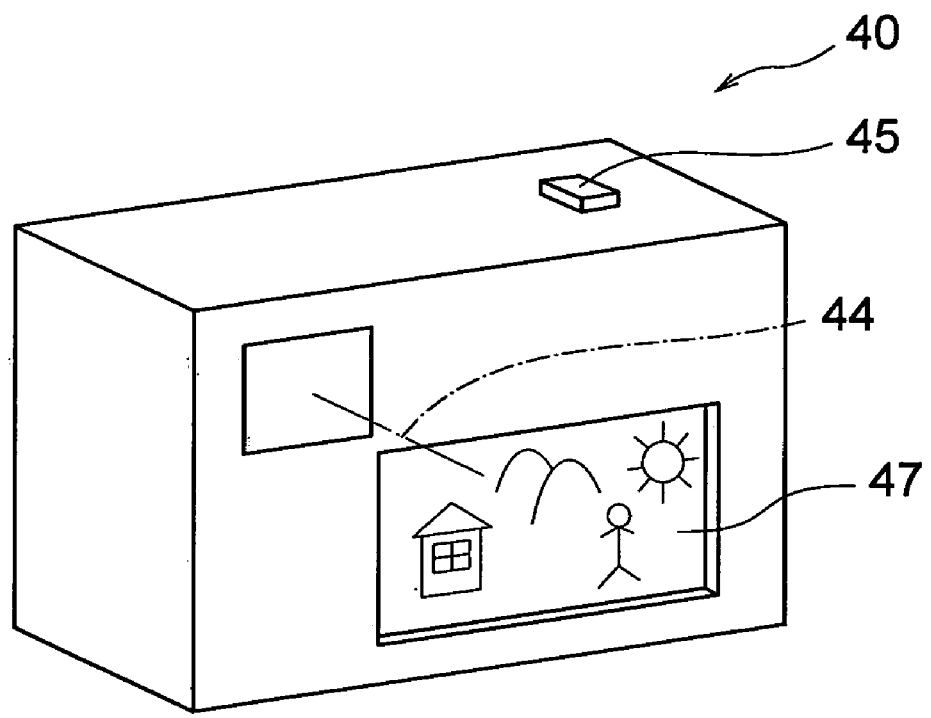
FIG. 6 is a rear perspective view of the digital camera 40.
Figure 7:
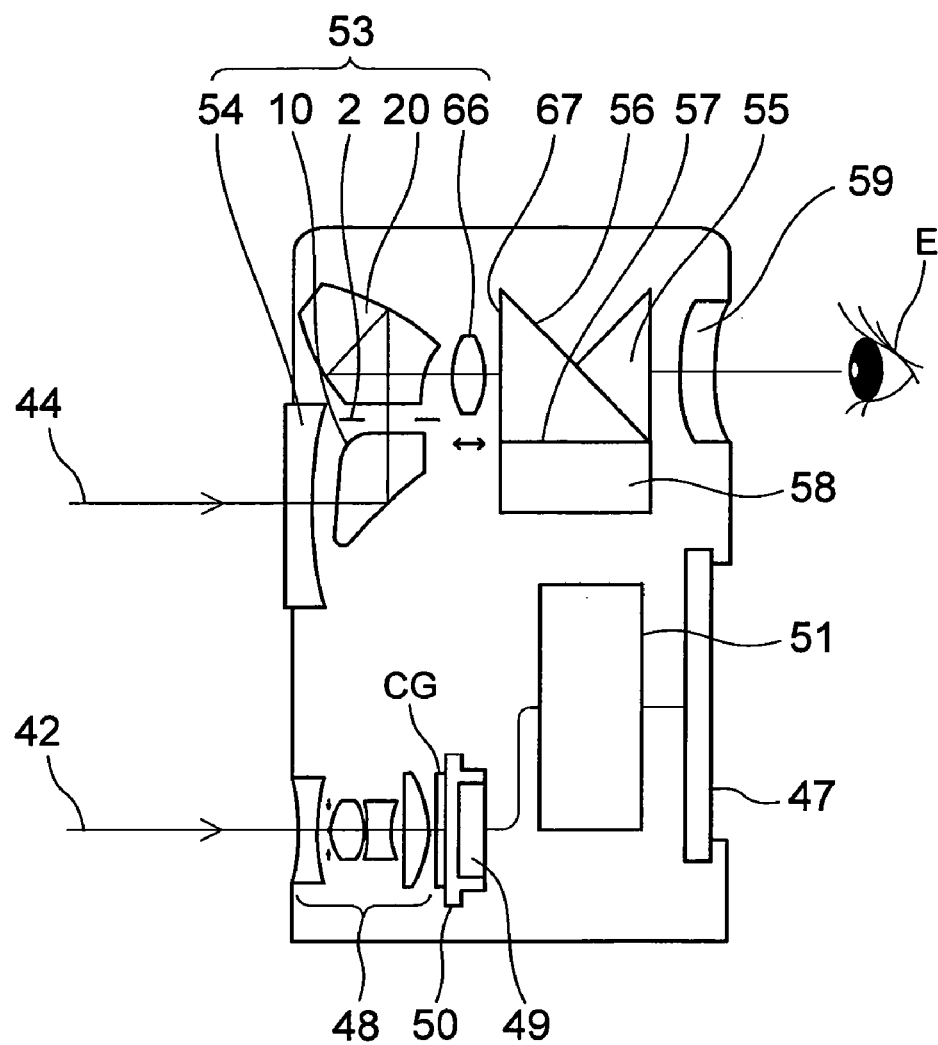
FIG. 7 is a cross-sectional view showing an optical arrangement of the digital camera 40.

In FIG. 5 to FIG. 7 show conceptual diagrams of structures in which the image forming optical system according to the present invention is incorporated in a photographic optical system 41 of a digital camera. FIG. 5 is a frontward perspective view showing an appearance of a digital camera 40, FIG. 6 is a rearward perspective view of the same, and FIG. 7 is a cross-sectional view showing an optical arrangement of the digital camera 40.

The digital camera 40, in a case of this example, includes the photographic optical system 41 having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 such as the zoom lens in the first embodiment.

An object image formed by the photographic optical system 41 is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording electronically by a flexible disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced.

Figure 8:
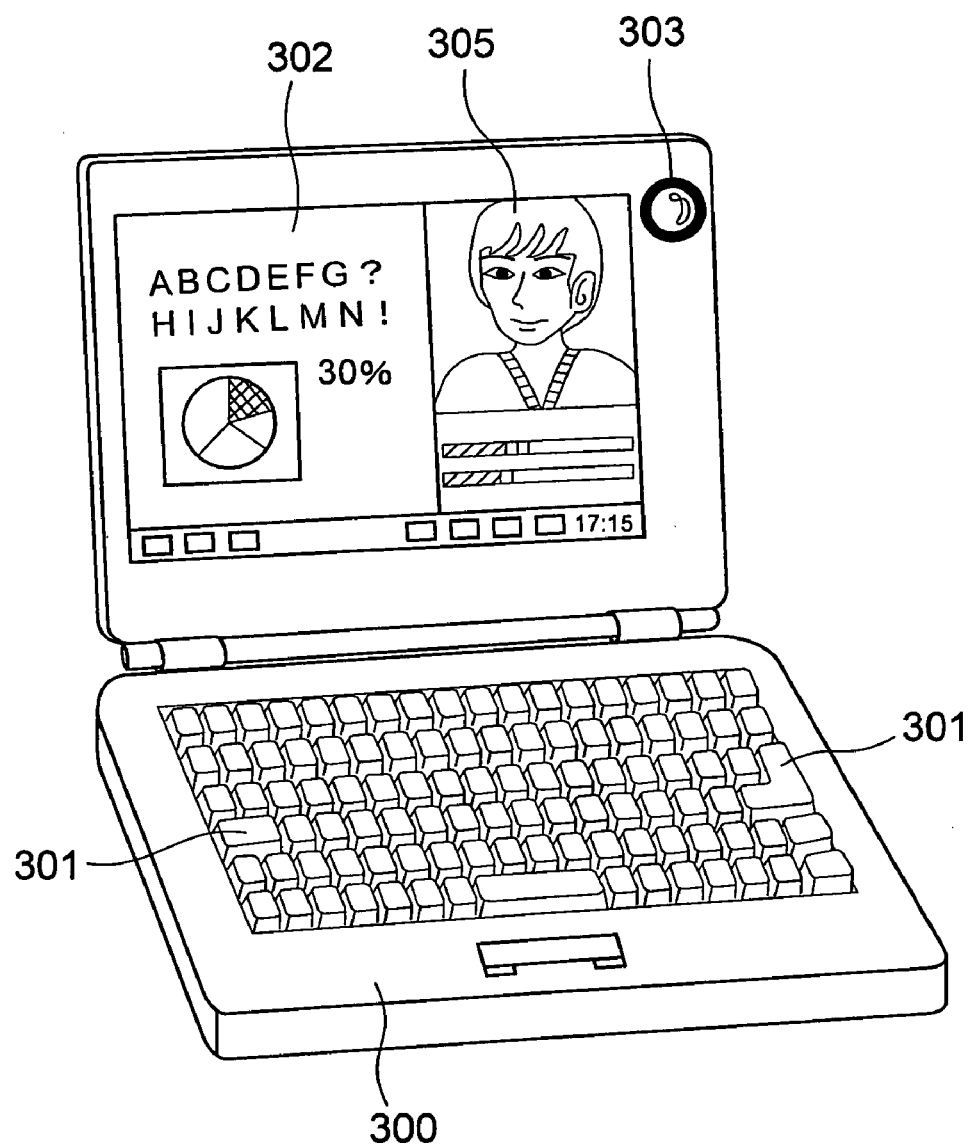
FIG. 8 is a front perspective view of a state in which, a cover of a personal computer 300 which is an example of an information processing unit in which, the zooming optical system of the present invention is built-in as an objective optical system, is opened.
Figure 9:
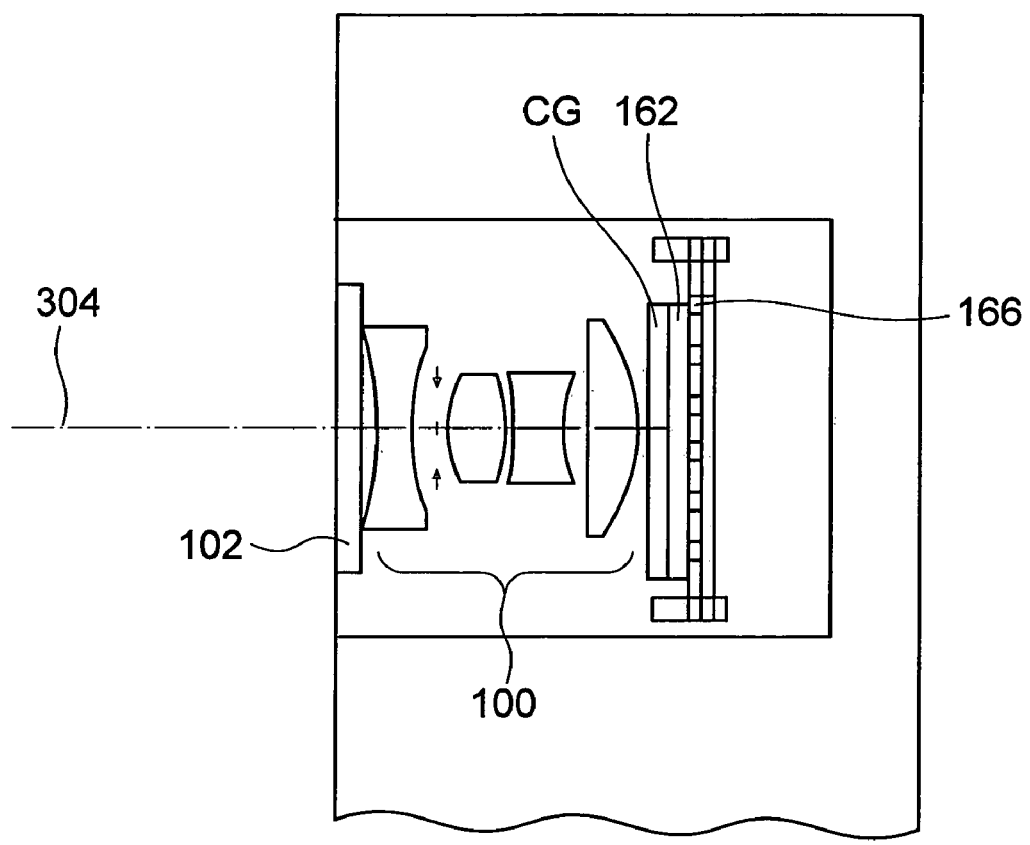
FIG. 9 is a cross-sectional view of an image pickup optical system 303 of the personal computer 300.
Figure 10:
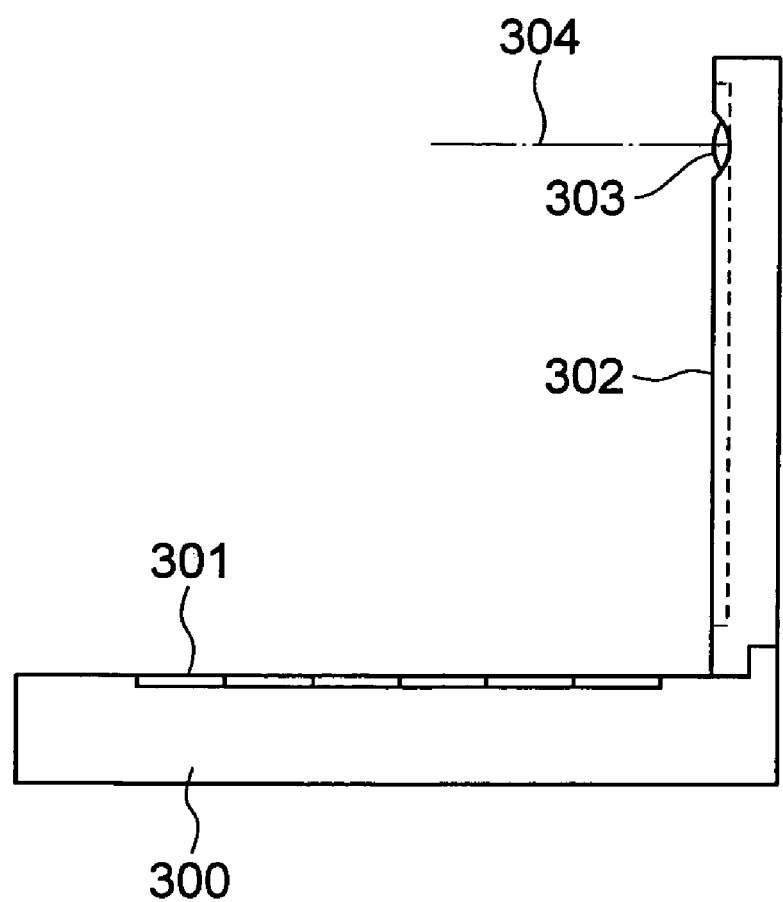
FIG. 10 is a side view of the personal computer 300.

Next, a personal computer which is an example of an information processing apparatus with a built-in image forming system as an objective optical system is shown in FIG. 8 to FIG. 10. FIG. 8 is a frontward perspective view of a personal computer 300 with its cover opened, FIG. 9 is a cross-sectional view of a photographic optical system 303 of the personal computer 300, and FIG. 10 is a side view of FIG. 8. As it is shown in FIG. 8 to FIG. 10, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 8, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 11A:
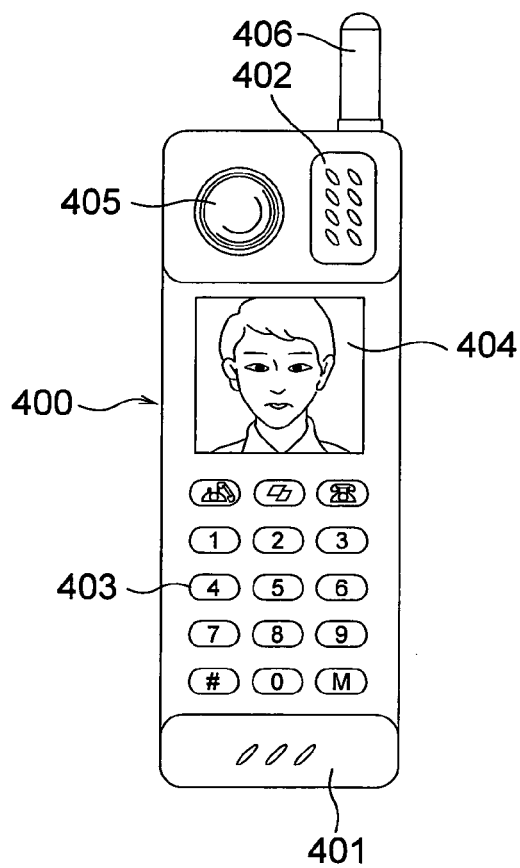
FIG. 11A, FIG. 11B, and FIG. 11C are diagrams showing a mobile telephone which is an example of an information processing apparatus in which, the zooming optical system of the present invention is incorporated as an image pickup optical system, where.
Figure 11B:
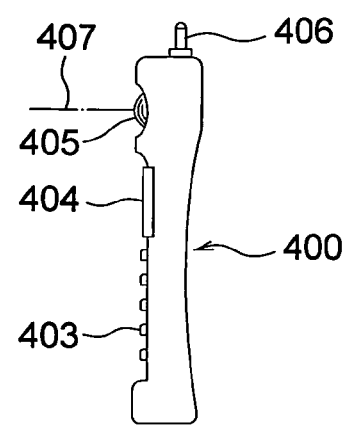
Figure 11C:
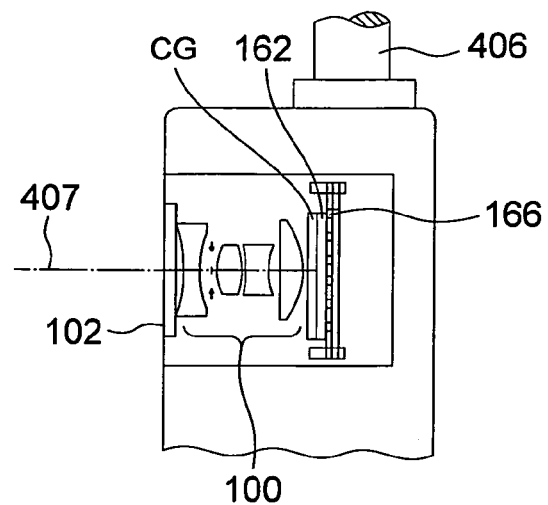

Next, a telephone which is an example of an information processing apparatus in which the image forming optical system of the present invention is built-in as a photographic optical system, particularly a portable telephone which is easy to carry is shown in FIG. 11A, FIG. 11B, and FIG. 11C. FIG. 11A is a front view of a portable telephone 400, FIG. 11B is a side view of the portable telephone 400, and FIG. 11C is a cross-sectional view of a photographic optical system 405. As shown in FIG. 83A to FIG. 83C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

The image forming optical system and the electronic image pickup apparatus according to the present invention show an effect of having a favorable capability of correcting aberration, and a reduction of occurrence of a flare including spreading of color.

What is claimed is:

1. An image forming optical system comprising in order from an object side to an image surface;
   a first lens group having a positive refracting power;
   a second lens group having a negative refracting power; and
   a third lens group having a positive refracting power, wherein
   at the time of zooming from a wide angle end to a telephoto end, a distance between the first lens group and the second lens group increases, and a distance between the second lens group and the third lens group decreases, and
   the first lens group has a cemented lens which includes a first lens element E1, a second lens element E2, and a third lens element E3, and
   in the cemented lens, the first lens element E1 is cemented to a surface on one side of the second lens element E2, and the third lens element E3 is cemented to another surface of the second lens element E2, and
   the first lens element E1 is a negative lens, and the second lens element E2 is a positive lens, and
   the image forming optical system satisfies the following conditional expressions (1), (2), (3), and (4)

$$20 < |\nu_{eff} - \nu_3| < 80 \tag{1}$$

$$0 < |\theta gFeff - \theta gF3| < 0.10 \tag{2}$$

$$0.5 < \theta gF2 < 0.9 \tag{3}$$

$$1.2 < (fG1 + 0.7\ ft)/enz < 5 \tag{4}$$

where,
$\nu 1$, $\nu 2$, and $\nu 3$ denote Abbe's number for the first lens element E1, the second lens element E2, and the third lens element E3 respectively,
fE1 and fE2 denote focal length of the first lens element E1 and the second lens element E2 respectively,
f double denotes a combined focal length of the cemented lens when a boundary surface on an image surface side of the second lens element E2 is air,
$\theta gF1$ denotes a partial dispersion ratio (ng1−nF1)/(nF1−nC1) of the first lens element E1,
$\theta gF2$ denotes a partial dispersion ratio (ng2−nF2)/(nF2−nC2) of the second lens element E2,
$\theta gF3$ denotes a partial dispersion ratio (ng3−nF3)/(nF3−nC3) of the third lens element E3,
nC1, nF1, and ng1 denote a refractive index of the first lens element E1 for a C-line, an F-line, and a g-line respectively,
nC2, nF2, and ng2 denote a refractive index of the second lens element E2 for the C-line, the F-line, and the g-line respectively,
nC3, nF3, and ng3 denote a refractive index of the third lens element E3 for the C-line, the F-line, and the g-line respectively,
$\nu$ deff and $\theta$gFeff denote equivalent Abbe's number and equivalent partial dispersion ratio respectively when the cemented lens includes only the first lens element E1 and the second lens element E2, and are expressed by the following expressions $$\nu_{deff} = \frac{1}{f_t \cdot \left(\frac{\phi_1}{\nu 1} + \frac{\phi_2}{\nu 2}\right)} = \frac{\nu 1 \cdot \nu 2}{a \cdot \nu 2 + (1-a) \cdot \nu 1}$$

$$\theta gFeff = f_{double} \cdot \nu e \left(\frac{\theta gF1}{\nu 1} \cdot \phi_1 + \frac{\theta gF2}{\nu 2} \cdot \phi_2\right)$$
$$= \nu e \left(\frac{a \cdot \nu 2 \cdot \theta gF1 + (1-a) \cdot \nu 1 \cdot \theta gF2}{\nu 1 \cdot \nu 2}\right)$$

where, $$a = \frac{\phi_1}{\phi_1 + \phi_2}$$

$$\phi_1 = \frac{1}{fE1}$$

$$\phi_2 = \frac{1}{fE2}$$

where,
fG1 denotes a focal length of the first lens group,
ft denotes a focal length at the telephoto end of the image forming optical system, and
enz denotes a distance from a first lens surface of the image forming optical system up to an entrance-pupil position.

2. The image forming optical system according to claim 1, wherein the image forming optical system satisfies the following conditional expression (5)

$$2.5 < fE2/fG1 < 3.0 \tag{5}$$

where,
fG1 denotes the focal length of the first lens group, and
fE2 denotes a focal length of the second lens element.

3. The image forming optical system according to claim 1, wherein
   each of the first lens element E1, the second lens element E2, and the third lens element E3 has a positive refracting power, and
   the cemented lens includes the first lens element E1, the second lens element E2, and the third lens element E3, and
   the first lens group includes a single lens having a positive refracting power, and the cemented lens.

4. The image forming optical system according to claim 1, wherein
   the first lens group includes a single lens having a positive refracting power, and
   the single lens having a positive refracting power is disposed on an object side than the cemented lens.

5. The image forming optical system according to claim 4, wherein the image forming optical system satisfies the following conditional expression (6)

$$0.5 < (Ra + Rb)/(Ra - Rb) < 1.2 \tag{6}$$

where,
Ra denotes a radius of curvature of an image-side surface of the single lens having a positive refracting power, and
Rb denotes a radius of curvature of an object-side surface of the cemented lens.

6. The image forming optical system according to claim 1, wherein a surface on the object side of a lens positioned nearest to the object side in the second lens group is a concave surface.

7. An electronic image pickup apparatus comprising:
an image forming optical system described in claim 1; and
an electronic image pickup element.

* * * * *